United States Patent
Kirklin

(10) Patent No.: US 8,623,564 B2
(45) Date of Patent: Jan. 7, 2014

(54) METHOD FOR REMEDIAL ACTION IN THE EVENT OF THE FAILURE OF THE PRIMARY AIR FLOW MEASUREMENT DEVICE IN A FUEL CELL SYSTEM

(75) Inventor: Matthew C Kirklin, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1083 days.

(21) Appl. No.: 12/262,889

(22) Filed: Oct. 31, 2008

(65) Prior Publication Data

US 2010/0112386 A1 May 6, 2010

(51) Int. Cl.
  H01M 8/04 (2006.01)
(52) U.S. Cl.
  USPC ........... 429/428; 429/429; 429/430; 429/408; 429/413; 429/432; 429/444
(58) Field of Classification Search
  USPC ......... 429/430, 408, 434, 429, 413, 444, 428, 429/432
  See application file for complete search history.

(56) References Cited

U.S. PATENT DOCUMENTS

| | | | |
|---|---|---|---|
| 6,504,717 B1 * | 1/2003 | Heard | 361/695 |
| 2002/0022161 A1 * | 2/2002 | Kurosaki et al. | 429/13 |
| 2004/0159147 A1 * | 8/2004 | Ueda et al. | 73/118.1 |
| 2005/0164057 A1 * | 7/2005 | Pospichal et al. | 429/25 |
| 2008/0160361 A1 * | 7/2008 | Ohara et al. | 429/17 |
| 2010/0239928 A1 * | 9/2010 | Tsuchiya | 429/430 |

FOREIGN PATENT DOCUMENTS

WO WO/2007/117018 * 10/2007

* cited by examiner

*Primary Examiner* — Patrick Ryan
*Assistant Examiner* — Alex Usyatinsky
(74) *Attorney, Agent, or Firm* — John A. Miller; Miller IP Group, PLC

(57) ABSTRACT

A system and method for controlling the speed of a compressor in the event that an airflow meter that measures the airflow from the compressor to the cathode input of the stack fails. When a failure of the airflow meter is detected, an algorithm first deactivates the primary feedback control algorithms used to control cathode pressure and flow, and sets the cathode exhaust valve to a fully open position. The speed of the compressor is controlled by an open loop set-point and the airflow from the compressor is estimated by a model using compressor discharge pressure and the compressor speed. The cathode by-pass valve position is determined by calculating the difference between the requested cathode airflow and the modeled compressor output flow. The position of the by-pass valve is then adjusted using the valve characteristics and the compressor discharge pressure. The estimated airflow to the stack is used to control the maximum stack current.

19 Claims, 2 Drawing Sheets

//  METHOD FOR REMEDIAL ACTION IN THE EVENT OF THE FAILURE OF THE PRIMARY AIR FLOW MEASUREMENT DEVICE IN A FUEL CELL SYSTEM

BACKGROUND OF THE INVENTION

1. Field of the Invention

This invention relates generally to a system and method for controlling airflow to a fuel cell stack in the event of a cathode input flow meter failure and, more particularly, to a system and method for controlling the flow of cathode input air to a fuel cell stack in a fuel cell system in the event that a flow meter for measuring the airflow fails by providing open-loop control of a compressor.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack.

Proper airflow measurement and control to the cathode side of a fuel cell stack is critical for the operation of a fuel cell system. If too much air is delivered to the stack, energy is wasted and the fuel cells in the stack may become too dry, affecting their durability. Too little air delivered to the stack can result in fuel cell instability due to oxygen starvation. Therefore, fuel cell systems typically employ an airflow meter in the cathode input line to provide an accurate measurement of the flow of air to the fuel cell stack. If the airflow meter fails, it has typically been necessary to shut the fuel cell system down because by not knowing the amount of air being delivered to the fuel cell stack with enough accuracy could have a detrimental effect on system components.

In order to increase the reliability of a fuel cell system, it is desirable to continue to operate the system in the event that the primary cathode airflow measuring device fails and to maintain an acceptable level of performance without causing long term damage to the system or stack components.

SUMMARY OF THE INVENTION

In accordance with the teachings of the present invention, a system and method are disclosed for controlling the speed of a compressor in a fuel cell system in the event that an airflow meter that measures the airflow from the compressor to the cathode input of the stack fails. When a failure of the airflow meter is detected, an algorithm first deactivates the primary feedback control algorithms used to control cathode pressure and flow, and sets the cathode exhaust valve to a fully open position. Next, the speed of the compressor is controlled by an open loop set-point and the airflow from the compressor is estimated by a model using compressor discharge pressure and the compressor speed. The cathode by-pass valve position is determined by calculating the difference between the requested cathode airflow and the modeled compressor output flow. The position of the by-pass valve is then adjusted using the valve characteristics and the compressor discharge pressure. The estimated airflow to the stack is used to control the maximum stack current.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling a cathode air compressor in response to a failure of an airflow meter is merely exemplary in nature, and is in no way intended to limit the invention or its applications or uses.

Figure 1:
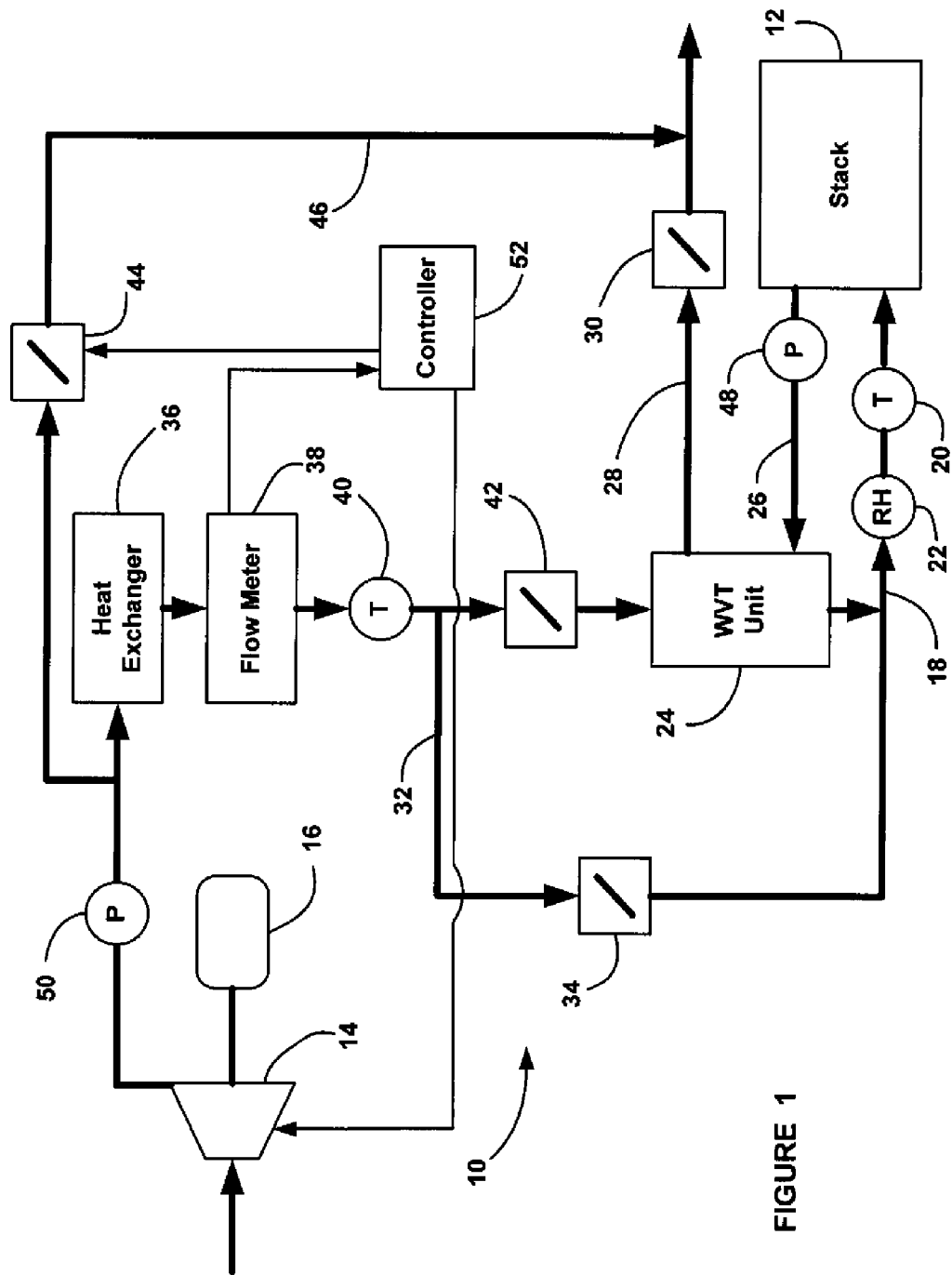
FIG. 1 is a schematic block diagram of a fuel cell system employing a process for controlling the speed of a cathode input compressor in the event of a failure of an airflow meter, according to an embodiment of the present invention.

FIG. 1 is a schematic block diagram of a fuel cell system 10 including a fuel cell stack 12. The fuel cell system 10 also includes a compressor 14 driven by a motor 16 that provides an airflow to a cathode side of the fuel cell stack 12 on a cathode input line 18. A temperature sensor 20 measures the temperature of the cathode input air into the stack 12 and an RH sensor 22 measures the relative humidity of the cathode input air into the stack 12. The humidity of the cathode input air is provided by a water vapor transfer (WVT) unit 24 that receives a cathode exhaust gas on cathode exhaust line 26 that typically has a humidity of 100% or more. Water and water vapor from the cathode exhaust gas is used in the WVT unit 24 to humidify the cathode input air that is provided on the input line 18. A pressure sensor 48 in the cathode exhaust line 26 measures the pressure of the cathode side of the stack 12. The cathode exhaust gas is output from the WVT unit 24 on system output line 28 and is controlled by a cathode exhaust gas valve 30. For those times when it may not be desirable to humidify the cathode input air, the cathode input air can be directed around the WVT unit 24 on by-pass line 32 through a by-pass valve 34.

The cathode input air from the compressor 14 is sent to a heat exchanger 36 that reduces the temperature of the cathode input air as a result of it being compressed by the compressor 14. Additionally, the heat exchanger 36 can provide heat to the cathode input air during certain times, such as cold start up, to heat the fuel cell stack 12 more quickly. A pressure sensor 50 at the output of the compressor 14 measures the discharge pressure of the compressor 14. The cathode input air from the heat exchanger 36 is sent through an airflow measuring device 38, such as a mass flow meter, that measures the flow of the cathode input air to the stack 12. As is well understood to those skilled in the art, the flow of the cathode input air to the stack 12 needs to be tightly controlled to provide the proper cathode stoichiometry so that too much air is not provided to the stack 12, which could have an adverse drying effect on the membranes within the fuel cells in the stack 12, or too little of air that can cause fuel cell instability as a result of oxygen starvation. A temperature sensor 40 measures the temperature of the cathode input airflow to control the heat exchanger 36 and a valve 42 controls the amount of cathode air that flows into the WVT unit 24 or by-passes the WVT unit 24 on the by-pass line 32.

The flow of air from the compressor 14 to the cathode side of the stack 12 is controlled by a controller 52 based on the stack current demand and the stack pressure. Being able to tune the compressor 14 to provide the exact amount of air for the desired cathode stoichiometry is typically not possible. Therefore, a cathode by-pass valve 44 is provided that proportionally controls the amount of cathode input air that by-passes the stack 12 or flows to the stack 12 through the heat exchanger 26. The cathode air that by-passes the stack 12 flows through a by-pass line 46 and directly to the system output line 28.

As discussed above, it is necessary to know the amount of cathode airflow to the fuel cell stack 12 for proper stack operation. Therefore, if the airflow measuring device 38 fails, it is desirable to have a fallback position where the airflow to the fuel cell stack 12 can be determined. According to an embodiment of the present invention, in the event of a failure of the airflow measuring device 38, an algorithm of the controller 52 first deactivates the primary feedback control algorithms used to control pressure and flow to the fuel cell stack 12, and sets the cathode exhaust gas valve 30 to a fully open position. Also, the speed of the compressor 14 is set by an open-loop set-point of the controller 52 for a particular stack power request from a look-up table, and the airflow from the compressor 14 is estimated by a model using the compressor discharge pressure and the compressor speed. The position of the by-pass valve 44 is determined by the controller 52 by calculating the difference between the requested compressor flow from the open-loop set-point and the modeled compressor output flow. The position of the valve 44 is adjusted using the valve characteristics and the compressor discharge pressure. The resulting estimated stack airflow to the stack is used to control the maximum stack current.

Figure 2:
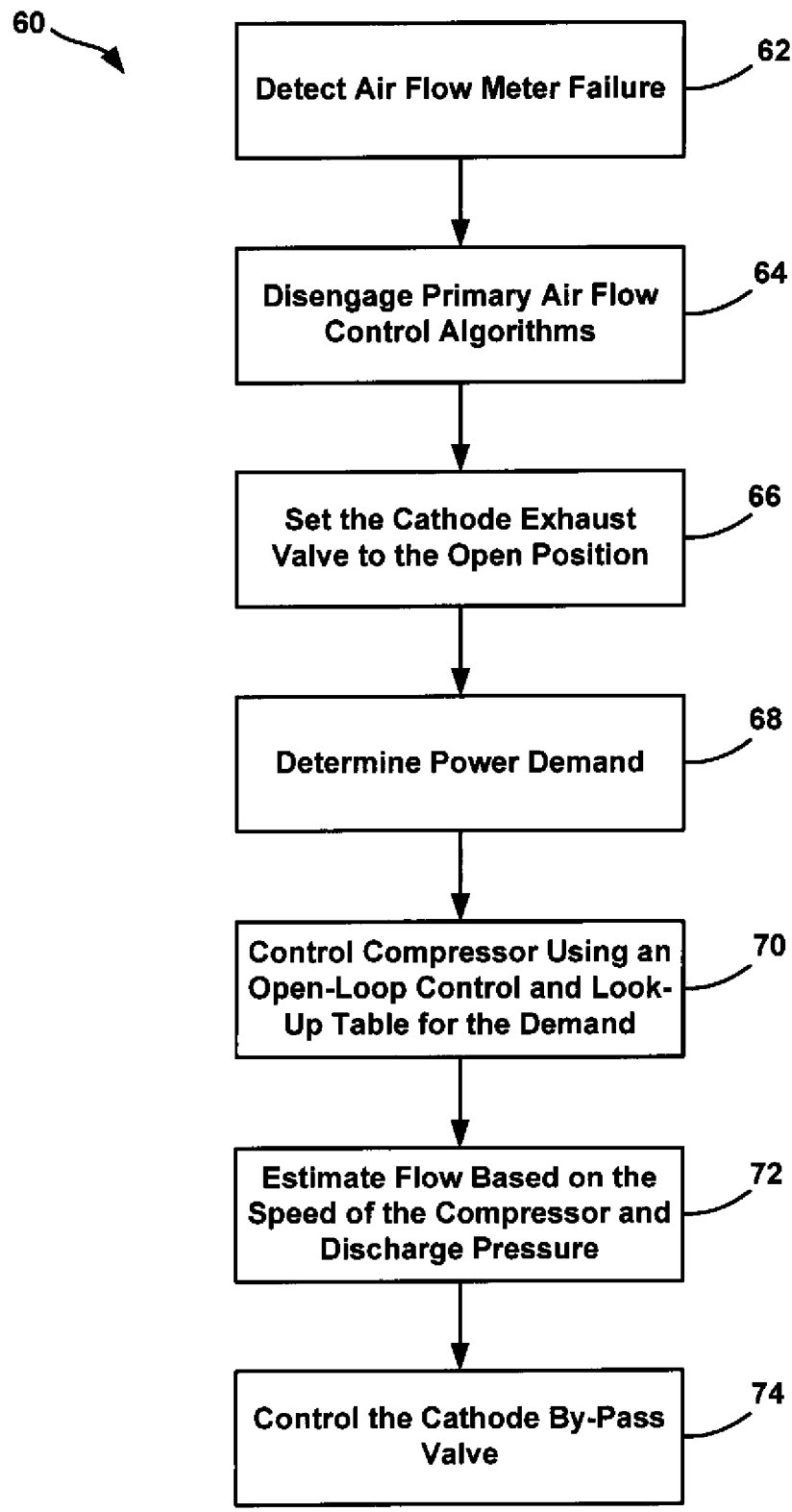
FIG. 2 is a flow chart diagram showing the process for controlling the speed of the compressor in response to failure of the airflow meter.

FIG. 2 is a flow chart diagram showing a process for controlling the airflow to the cathode side of the fuel cell stack 12 in the event of a failure of the airflow measuring device 38, as discussed above. The airflow control algorithm detects an airflow measuring device failure at box 62, and then disengages the primary airflow control algorithms at box 64. The algorithm then sets the cathode exhaust valve 30 to its fully opened position at box 66. The algorithm then determines a power demand from the stack 12 at box 68. Based on that power demand, the algorithm controls the speed of the compressor 14 using an open-loop control set-point and a look-up table at box 70. Because the airflow to the stack 12 will depend on the cathode pressure, the open-loop control of the compressor 14 is a combination of the speed of the compressor 14 and the discharge pressure of the compressor 14. Therefore, the open-loop control algorithm will estimate or model the compressor flow based on the speed of the compressor 14 and the discharge pressure at box 72 to give a more accurate reading of the airflow. If the flow is more than what is necessary for the power demand, the airflow can be tuned using the cathode by-pass valve 44 by opening the valve 44 at box 74 based on the valve characteristics to reduce the flow to the stack 12. Reducing the flow to the stack 12 may have application for idle speeds.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling an airflow to a fuel cell stack, said method comprising:
   a controller programmed to:
   detecting that an airflow measuring device that measures the airflow to the fuel cell stack has failed;
   disengaging primary airflow control algorithms in response to the detected failure;
   setting a cathode exhaust valve to an open position;
   determining a power request from the fuel cell stack; and
   controlling the speed of a compressor that provides the cathode airflow to the stack using an open-loop control, wherein controlling the speed of the compressor includes determining a predetermined speed of the compressor for the power request, estimating the airflow to the fuel cell stack based on the speed of the compressor and a discharge pressure of the compressor and controlling a cathode by-pass valve to reduce the cathode airflow if the estimated flow is too high for the power request.

2. The method according to claim 1 wherein determining a predetermined speed of the compressor for the power request includes using a look-up table to determine the speed of the compressor.

3. The method according to claim 1 wherein controlling the cathode by-pass valve includes calculating the difference between the compressor airflow from the predetermined speed and the estimated airflow.

4. The method according to claim 3 wherein controlling the cathode by-pass valve includes determining valve characteristics to determine how much to open or close the by-pass valve.

5. The method according to claim 1 wherein the discharge pressure of the compressor is measured by a pressure sensor at the output of the compressor.

6. The method according to claim 1 wherein the airflow measuring device is a mass airflow meter.

7. A method for controlling an airflow to a fuel cell stack, said method comprising:
a controller programmed to:
determining that an airflow measuring device that measures the airflow to a cathode side of the fuel cell stack has failed;
disengaging primary airflow control algorithms in response to the detected failure;
setting a cathode exhaust valve to an open position; and
controlling the speed of a compressor that provides the cathode airflow to the stack using an open-loop control.

8. The method according to claim 7 wherein controlling the speed of the compressor includes determining a predetermined speed of the compressor for the power request, estimating the airflow to the fuel cell stack based on the speed of the compressor and a discharge pressure of the compressor and controlling a cathode by-pass valve to reduce the cathode airflow if the estimated flow is too high for the power request.

9. The method according to claim 8 wherein controlling the cathode by-pass valve includes calculating the difference between the compressor airflow from the predetermined speed and the estimated airflow.

10. The method according to claim 9 wherein controlling the cathode by-pass valve includes determining valve characteristics to determine how much to open or close the by-pass valve.

11. The method according to claim 7 wherein determining a predetermined speed of the compressor for the power request includes using a look-up table to determine the speed of the compressor.

12. The method according to claim 7 wherein the discharge pressure of the compressor is measured by a pressure sensor at the output of the compressor.

13. The method according to claim 7 wherein the airflow measuring device is a mass airflow meter.

14. A system for controlling an airflow to a fuel cell stack, said system comprising:
a controller programmed to provide
means for detecting that an airflow measuring device that measures the airflow to the fuel cell stack has failed;
means for disengaging primary airflow control algorithms in response to the detected failure;
means for setting a cathode exhaust valve to an open position;
means for determining a power request from the fuel cell stack; and
means for controlling the speed of a compressor that provides the cathode air to the stack using an open-loop control, said means for controlling the compressor including means for determining a predetermined speed of the compressor for the power request, means for estimating the airflow to the fuel cell stack based on the speed of the compressor and a discharge pressure of the compressor and means for controlling a cathode by-pass valve to reduce the cathode airflow if the estimated flow is too high for the power request.

15. The system according to claim 14 wherein the means for determining a predetermined speed of the compressor for the power request includes that the controller is further programmed to use a look-up table to determine the speed of the compressor.

16. The system according to claim 14 wherein the means for controlling the cathode by-pass valve includes that the controller is further programmed to include means for calculating the difference between the compressor airflow from the predetermined speed and the estimated airflow.

17. The system according to claim 16 wherein the means for controlling the cathode by-pass valve includes that the controller is further programmed to include means for determining valve characteristics to determine how much to open or close the by-pass valve.

18. The system according to claim 14 wherein the discharge pressure of the compressor is measured by a pressure sensor at the output of the compressor.

19. The system according to claim 14 wherein the airflow measuring device is a mass airflow meter.

\* \* \* \* \*